April 5, 1938.                H. O. LETZERICH                 2,112,851
      AUXILIARY SPRING AND TRANSVERSE EQUALIZING BEAM ARRANGEMENT FOR TRUCKS
                         Filed Aug. 25, 1934        2 Sheets-Sheet 1
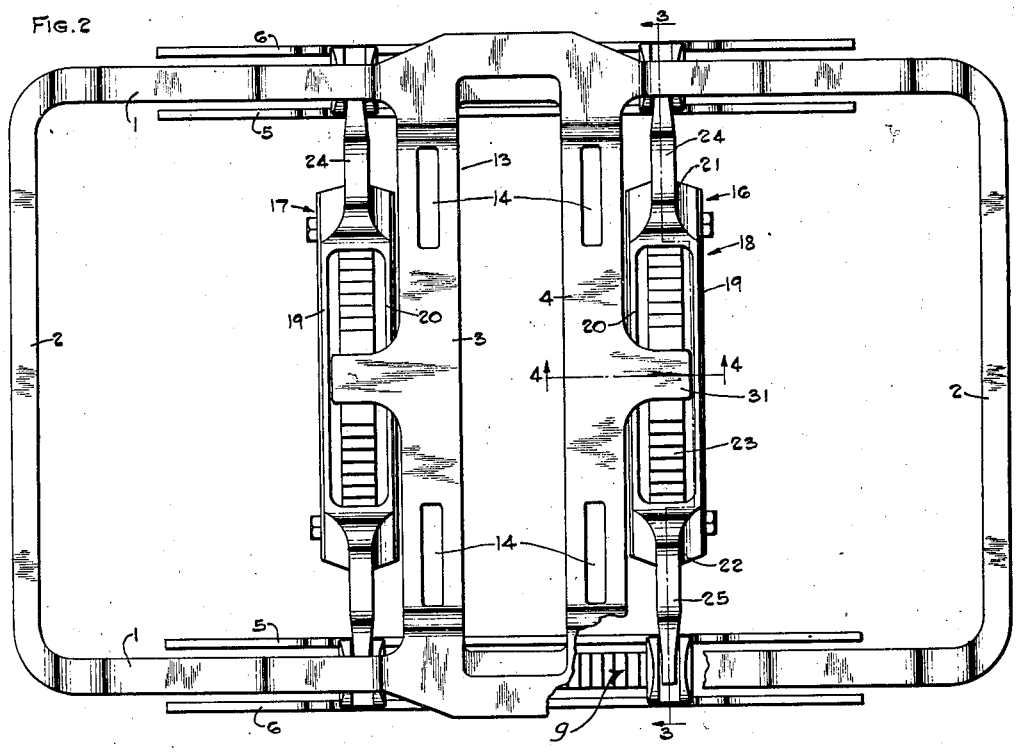
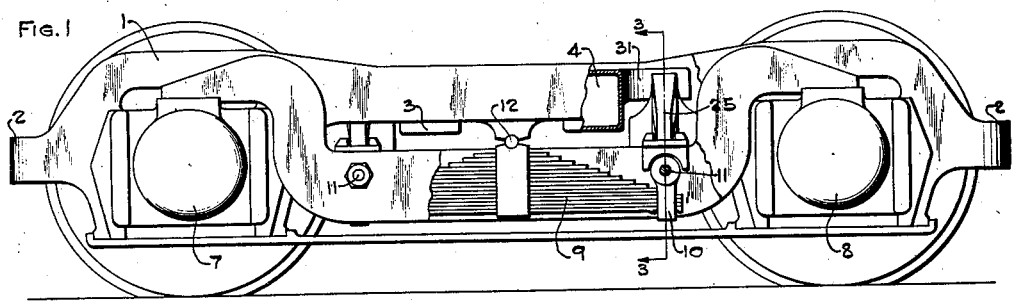
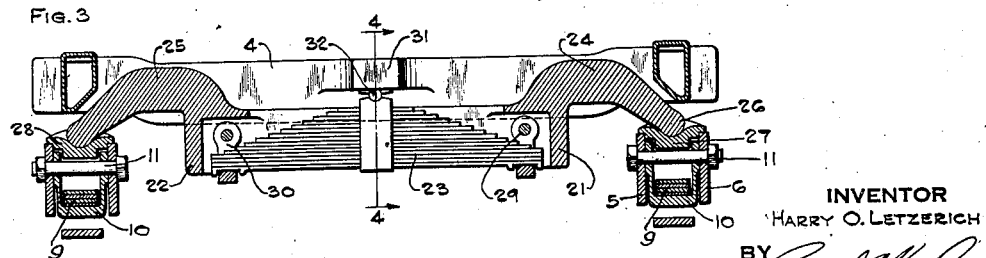
INVENTOR
HARRY O. LETZERICH
BY
ATTORNEY April 5, 1938.     H. O. LETZERICH     2,112,851
AUXILIARY SPRING AND TRANSVERSE EQUALIZING BEAM ARRANGEMENT FOR TRUCKS
Filed Aug. 25, 1934     2 Sheets-Sheet 2
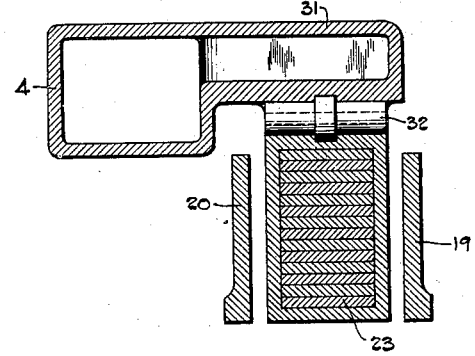
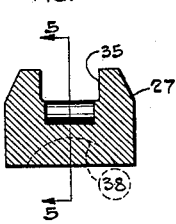
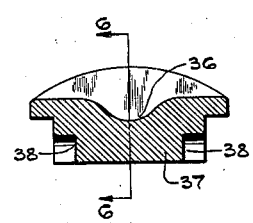
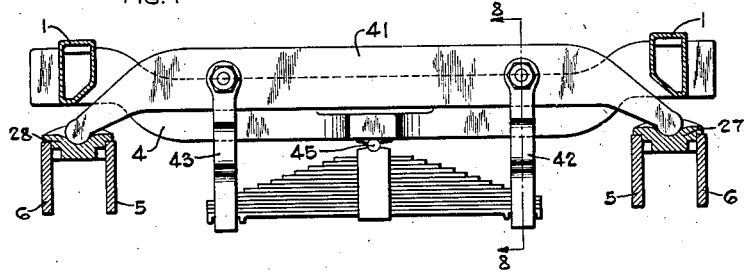
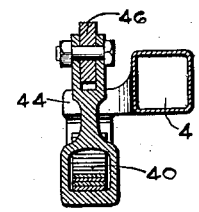
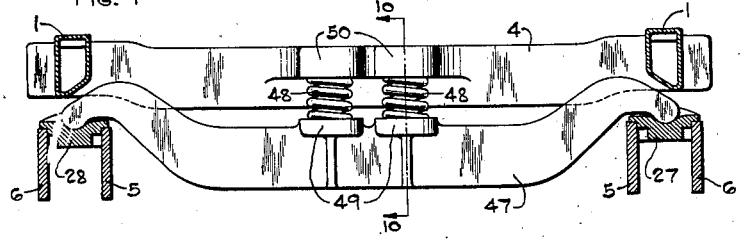
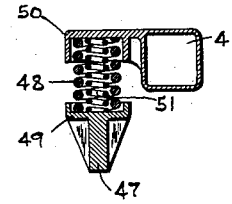
INVENTOR
HARRY O. LETZERICH
BY
ATTORNEY Patented Apr. 5, 1938

2,112,851

UNITED STATES PATENT OFFICE 2,112,851

AUXILIARY SPRING AND TRANSVERSE EQUALIZING BEAM ARRANGEMENT FOR TRUCKS

Harry O. Letzerich, Philadelphia, Pa.

Application August 25, 1934, Serial No. 741,365

8 Claims. (Cl. 105—194)

This invention relates generally to railway trucks and more particularly to an improved arrangement for providing ample spring capacity especially where the weight of the equipment has reached large proportions.

Many types of modern steam and electric locomotives have acquired very large proportions and weight, and hence in the usual type of truck design the two longitudinal springs located between the longitudinal equalizing beams must be made so large and with spring plates or leaves so thick that much of the desired flexibility is lost with the result that the truck is rough riding and imposes undue stresses on the rails, roadbed, truck and vehicle supported by the truck.

It is one object of my invention to provide an improved truck arrangement whereby springs may be effectively employed in cooperation with and in addition to those located between the longitudinal equalizing beams. A further object is to provide preferably in a usual type of truck frame improved transverse equalizing beams and springs so arranged in combination with the truck frame and the other spring construction as to provide a compact, simple and yet sturdy organization that will efficiently and amply take care of large loads with maximum flexibility and stability while at the same time adequately maintaining proper load distribution throughout the truck structure.

In accomplishing the foregoing objects I provide a truck frame having usual transoms and longitudinal equalizing beams in combination with transverse equalizing beams supported at their ends on the longitudinal equalizing beams and springs which may be either of the semi-elliptic or coil type interposed between said transverse equalizing beams and the truck transoms. More specifically the coil springs, when used, are preferably of such design with respect to the longitudinal springs as to break up harmonic vibrations, but in any event it is desired that the longitudinally and transversely arranged springs are adapted to have the load divided therebetween in any desired proportion. This can be effectively accomplished in my improved arrangement without imposing undue stresses on any particular part of the truck structure.

Other objects and advantages will be more apparent to those skilled in the art from the following description of the accompanying drawings in which:

Fig. 1 is a side elevation of a truck of my improved construction, broken away to show details of construction;

Fig. 2 is a plan view of Fig. 1 but omitting the usual swing bolster and link hangers for purposes of clarity;

Fig. 3 is a section on lines 3—3 of Figs. 1 and 2 and shows the additional transverse springs;

Fig. 4 is a vertical section taken on the lines 4—4 of Figs. 2 and 3;

Fig. 5 is an enlarged sectional view of a seat for the transverse equalizing beam, this section being taken specifically on the line 5—5 of Fig. 6;

Fig. 6 is a transverse section taken on the line 6—6 of Fig. 5;

Fig. 7 is a modification showing the transverse spring hung on links from the equalizing beam so as to permit the equalizing beam to be of substantially uniform cross-section throughout;

Fig. 8 is a vertical section taken on the line 8—8 of Fig. 7;

Fig. 9 is a further modification showing helical springs in place of the transverse leaf spring;

Fig. 10 is a section taken on the line 10—10 of Fig. 9.

In the illustrated embodiments of the invention which are shown herein merely for the purpose of disclosing certain specific forms among possible others that the invention might take, I have shown a standard or conventional type of truck having wheel pieces 1, end pieces 2 and transoms 3 and 4. Disposed along each of the wheel pieces 1 are pairs of longitudinal equalizer beams 5 and 6 resting upon journal boxes 7 and 8 in the usual manner. Longitudinal springs 9 are disposed between each pair of longitudinal equalizer beams 5 and 6 and are supported at their ends in spring links such as 10. These links, as is usual, are pivoted as at 11 between the pairs of equalizer beams 5 and 6. Weight is transmitted from the truck frame to the springs through any usual or suitable type of spring seat 12. It will be understood that the center plates, swing bolster and swing links therefore, have been omitted for sake of clarity from the usual space 13 and 14 provided for such elements.

To obtain effective and yet simple additional spring capacity, I have provided as shown in Fig. 2 transverse equalizer beams 16 and 17 disposed preferably outside of each of the transoms 3 and 4. Inasmuch as the transverse equalizer beams and spring construction are identical, it will suffice to describe only one. As shown in Fig. 2, the equalizer beam comprises a cradle generally indicated at 18 having side pieces 19 and 20 and end pieces 21 and 22 thereby forming a housing for a transverse spring 23. Extending outwardly from the cradle are arms 24 and 25 which, as shown more clearly in Fig. 3, preferably extend upwardly from the cradle and thence downwardly with rounded ends such as 26 seated in equalizer beam seats 27 and 28. These equalizer beam seats are supported on the longitudinal equalizer beams 5 and 6 and will be described more in detail later. The transverse spring 23 is supported on swing links 29 and 30 while weight is transmitted from the truck frame to said spring as by an arm 31 projecting laterally from the transom and thence through a spring seat 32 of any suitable type.

The equalizer seats 27 and 28 of the transverse equalizing beams are, as shown more fully in Figs. 5 and 6, formed with a slot 35 having a recess 36 to receive the rounded end 26 of the transverse beam. A boss or guiding portion 37 is of sufficient width so as to snugly fit between the longitudinal equalizer beams 5 and 6. The boss 37 is provided with a pair of notches 38 adapted to receive the upper ends of swing links 10 for the longitudinal springs 9. These notches in cooperation with the swing links will maintain the spring seats 27 and 28 in their proper longitudinal position with respect to the equalizer beams 5 and 6.

In the modification shown in Fig. 7, the transverse spring 40 is hung beneath a transverse equalizer beam 41 as through links 42 and 43. The transom is provided with a lateral extension 44 to permit weight to be transmitted to the spring through a spring seat 45. As a result of this construction, the equalizer beam 41 may be of substantially uniform cross-section such as shown at 46 in Fig. 8, while the ends of the beam may be suitably tapered or otherwise formed to be supported on the longitudinal equalizer beams.

In the modification shown in Figs. 9 and 10, a transverse equalizer beam 47 is underslung with its ends projecting upwardly to be supported in the longitudinal equalizer beams. The cross-sectional construction of this transverse equalizer beam may be of substantially the same construction as that shown in Fig. 7 or of any other suitable type, but in any event helical springs 48, preferably a plurality, are interposed between beam 47 and the transom 4, suitable spring seats 49 and 50 being provided for the springs as shown in Fig. 10. If desired, an inner set of springs 51 may be disposed within the outer coils.

From the foregoing disclosure of the several modifications, it is seen that I have provided a very simple and yet most effective construction and arrangement of parts for providing additional spring capacity for any suitable form of truck, although in view of my improved combination the additional spring capacity may be applied to any conventional or standard form of truck without material alteration thereto. It will also be appreciated that the load may be divided between the springs in any desired manner without in any way affecting the stability of the truck or of imposing undue strains on the truck frame.

It will of course be understood that various changes in details of construction and arrangement of parts may be made by those skilled in the art without departing from the spirit of the invention as set forth in the appended claims.

I claim:

1. A railway truck comprising, in combination, a frame having pedestals, spaced wheeled axles having journal boxes guided by said pedestals, longitudinal equalizing beams rockingly supported by each of said boxes, springs interposed between said frame and longitudinal equalizing beams so as to transmit load from the frame directly through the springs to said equalizing beams, transverse equalizing beams rockingly supported by said longitudinal equalizing beams, and springs interposed between said frame and said transverse equalizing beams.

2. A railway truck comprising, in combination, a frame having pedestals and transoms, spaced wheeled axles having journal boxes guided by said pedestals, longitudinal equalizing beams rockingly supported by each of said journal boxes, springs interposed between said frame and longitudinal equalizing beams so as to transmit load from the frame directly through the springs to said equalizing beams, transverse equalizing beams rockingly supported by said longitudinal equalizing beams, and springs interposed between said transoms and said transverse equalizing beams.

3. A railway truck comprising, in combination, a frame having transoms, spaced wheeled axles for said frame, longitudinal equalizing beams operatively supported by each of said axles, springs interposed between said frame and longitudinal equalizing beams so as to transmit load from the frame directly through the springs to said equalizing beams, transverse equalizing beams supported by said longitudinal equalizing beams, elements extending longitudinally from said transoms, and springs interposed between said elements and transverse equalizing beams.

4. A railway truck comprising, in combination, a frame having wheel side pieces and a pair of transoms, spaced wheeled axles for said frame, longitudinal equalizing beams operatively supported by each of said axles, springs interposed between said longitudinal equalizing beams and said wheel pieces so as to transmit load from the frame directly through the springs to said equalizing beams, transverse equalizing beams disposed to the side of said transoms and the outer ends of said transverse beams being supported by said longitudinal beams, elements extending laterally of said transoms to overlie said transverse beams, and springs interposed between said transverse beams and said lateral elements.

5. The combination set forth in claim 1 further characterized by the provision of means associated with said longitudinal equalizing beams for maintaining said transverse beams in substantially fixed longitudinal relation with respect thereto.

6. The combination set forth in claim 1 further characterized by the provision of swing links connected to said longitudinal equalizing beams for supporting the springs which are associated therewith, and seats for said transverse beams adapted for cooperation with said links to maintain said transverse beam in substantially fixed longitudinal relation with respect to said longitudinal beams.

7. The combination set forth in claim 1 further characterized in that said longitudinal equalizing beams each comprises a pair of laterally spaced parallel elements to receive the springs which are associated with the longitudinal beams, and seats for supporting the ends of said transverse beams, said seats being supported by said spaced elements and projecting downwardly therebetween.

8. A railway truck comprising, in combination, a frame having pedestals, spaced wheeled axles having journal boxes guided by said pedestals, transverse and longitudinal equalizing beams, said longitudinal beams being rockingly supported by said boxes and said transverse beams being rockingly supported by said longitudinal beams, two sets of springs, and means for supporting said sets of springs between said frame and beams so that said sets operate to carry the frame load in parallel with a predetermined load division between the sets.

HARRY O. LETZERICH.